(12) United States Patent
Gilman et al.

(10) Patent No.: US 6,389,159 B2
(45) Date of Patent: *May 14, 2002

(54) METHOD FOR PRODUCING PRINTS FROM DIGITAL IMAGE FILES SCANNED FROM FILM

(75) Inventors: Paul B. Gilman, Penfield; Jack C. Chang, Webster; Kenneth A. Parulski, Rochester; Jeffrey R. Pink, Fairport, all of NY (US)

(73) Assignee: Eastman Kodak Company, Rochester, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 09/759,469

(22) Filed: Jan. 12, 2001

Related U.S. Application Data

(63) Continuation of application No. 09/156,815, filed on Sep. 18, 1998, now Pat. No. 6,208,770.

(51) Int. Cl.[7] .................................................. G06K 9/00
(52) U.S. Cl. ........................................ 382/162; 382/305
(58) Field of Search ................................ 382/162, 167, 382/240, 305; 345/536, 150, 589; 348/96; 358/512, 518, 527; 463/31

(56) References Cited

U.S. PATENT DOCUMENTS

| | | | |
|---|---|---|---|
| 4,969,204 A | 11/1990 | Melnychuck et al. ........ | 382/240 |
| 5,050,230 A | 9/1991 | Jones et al. .................. | 138/164 |
| 5,070,032 A | 12/1991 | Yuan et al. .................. | 438/267 |
| 5,172,338 A | 12/1992 | Mehrotra et al. ........ | 365/185.03 |
| 5,218,455 A | 6/1993 | Kristy ......................... | 358/403 |
| 5,227,789 A | 7/1993 | Barry et al. .................. | 341/65 |
| 5,231,506 A * | 7/1993 | Manico et al. ............... | 358/302 |
| 5,241,659 A * | 8/1993 | Parulski et al. .............. | 345/150 |
| 5,268,870 A | 12/1993 | Hararl .................... | 365/185.09 |
| 5,279,148 A | 1/1994 | Brandes ................... | 73/40.5 R |
| 5,432,906 A | 7/1995 | Newman et al. ............. | 345/501 |
| 5,447,811 A * | 9/1995 | Buhr et al. .................... | 430/20 |
| 5,461,492 A | 10/1995 | Jones .......................... | 358/487 |
| 5,555,042 A | 9/1996 | Jones et al. .................. | 353/103 |
| 5,565,912 A | 10/1996 | Easterly et al. ............... | 348/96 |
| 5,595,389 A * | 1/1997 | Parulski et al. ................ | 463/31 |
| 5,609,978 A | 3/1997 | Giorgianni et al. ........... | 430/30 |
| 5,862,297 A * | 1/1999 | Timmermans ................ | 386/70 |
| 6,111,950 A | 8/2000 | Fredlund et al. ............. | 713/186 |
| 6,208,770 B1 * | 3/2001 | Gilman et al. ............... | 382/305 |

* cited by examiner

Primary Examiner—Leo Boudreau
Assistant Examiner—Kanji Patel
(74) Attorney, Agent, or Firm—Raymond L. Owens

(57) ABSTRACT

A method of providing colored adjusted digital files which can be used to make prints by a printing system, including a computer and a local printer, controlled by enabling software stored on the removable storage medium, the original images being provided on colored film, including the steps of scanning the colored film to produce a plurality of digital files representing colored digital images; adjusting the digital files to produce color adjusted digital files, such adjustments including tone scale correction; providing enabling software including at least one software application program for operating the computer that enables the color adjusted digital files to be printed on the local printer, and transferring the color adjusted digital files and the enabling software to the removable storage medium.

14 Claims, 6 Drawing Sheets

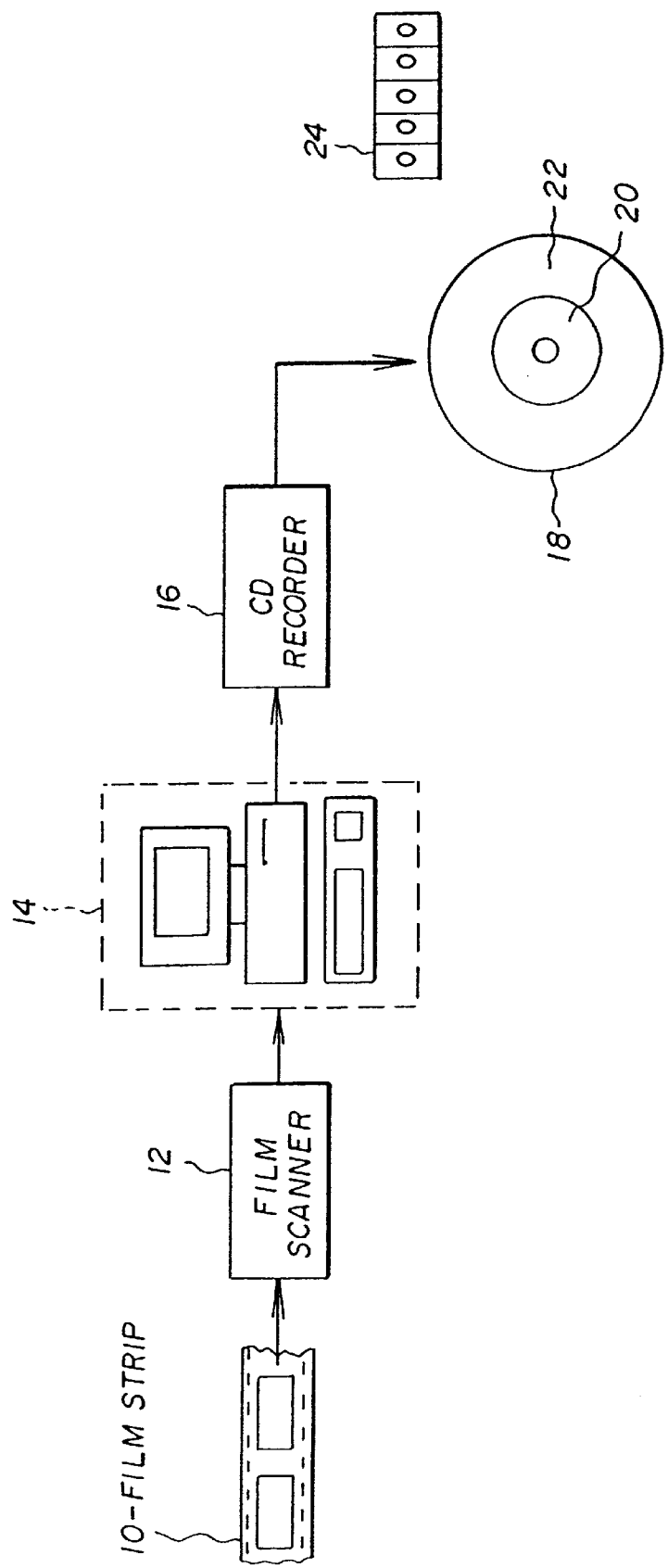

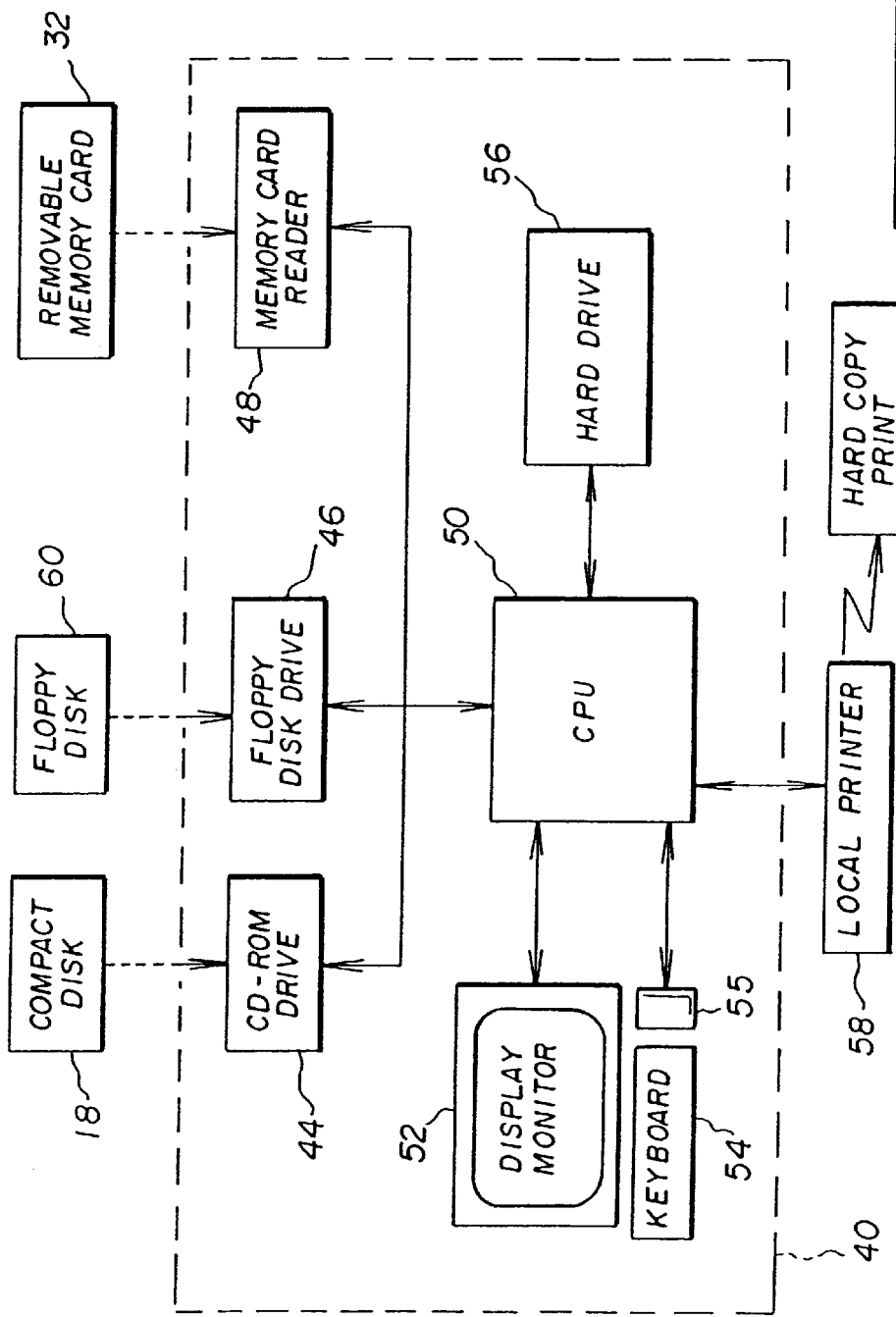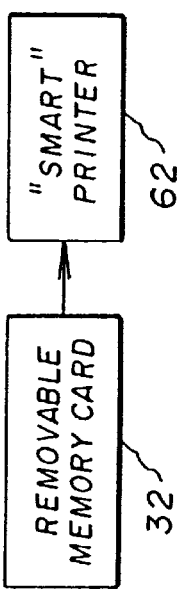

METHOD FOR PRODUCING PRINTS FROM DIGITAL IMAGE FILES SCANNED FROM FILM

CROSS REFERENCE TO RELATED APPLICATIONS

This application is a continuation of commonly-assigned U.S. patent application Ser. No. 09/156,815 filed Sep. 18, 1998 now U.S. Pat. No. 6,208,770 . Reference is also made to commonly assigned U.S. patent application No. 09/141, 686 filed Aug. 28, 1998, entitled "Selecting, Arranging, and Printing Digital Images From Thumbnail Images" to Bubie et al the disclosure of which is incorporated herein by reference.

FIELD OF THE INVENTION

This invention relates to producing digital colored prints from scanned original film by a particular printer.

BACKGROUND OF THE INVENTION

Digital colored images are often produced by electronic still cameras. They include an image sensor which has appropriate color filters. Analog signals are converted into digital signals and digital images are produced which are often called a digital file. There are many storage devices on which these digital images can be stored, including floppy magnetic discs, hard magnetic disc drives, optical discs including write once discs, digital tape, and flash cards. Oftentimes, a user will capture digital images on a digital camera and store them on a storage device. These images may later be downloaded to a host computer and printed using a local printer, such as a color inkjet printer, or sent via the internet to a remote printing service.

In another approach to providing digital colored images, a photographic film is scanned, digitized and converted to a digital file for each image. The Kodak PhotoCD™ system is an example of one such arrangement for scanning, digitizing, and providing a digital file for each image. Often, a user will have a service that will scan and digitize images to provide a digital file. These files are provided on memory storage media, such as a Kodak PhotoCD disc. A user may also purchase software programs or applications which will operate on these image files. These applications permit the customer to access, view, modify, and/or print the image files as desired. Adobe Photoshop™ is an example of software that can operate on digital image files to drive a printer for producing output images. The application that operate on the images to produce prints, such as Photoshop, are provided separately, rather than on the same PhotoCD disc that stores a customer's film images. As a result, it is difficult for an unskilled user to load the appropriate software into their host computer, launch the application (e.g. Photoshop) and then open the desired images from the PhotoCD, one at a time, in order to select and print images on their home printer.

A problem with many home printing arrangements is that they often require operator adjustment and that they are cumbersome and can take a significant amount of time. One reason for this is that there are a number of different printers and papers that can be used. In order to couple a printer to a stored color digital image, enabling software must be provided. High quality printers typically have a pull down or displayed menu which permits a user to select a particular type of printer transform to produce a print. For example, when Adobe Photoshop software is used to drive an Epson Stylus Photo Ink Jet Printer, the Epson printer has a number of user selectable modes such as Photo, Photoenhance, Graph, Text, and Advanced Photo, but these modes must be selected by the user. These can be used by skilled users to provide improved printing of continuous tone images from digital files made from scanning film negatives, such as from PhotoCD. However, the modes do not provide the best possible prints, since they do not take into account the print paper that is used. Furthermore, since a "Photo" mode is not automatically selected when a PhotoCD image is to be printed, an unskilled user may inadvertently use an undesirable mode, such as "text" or "graph", when printing the continuous tone images, thus producing poor quality prints.

SUMMARY OF THE INVENTION

It is an object of the present invention to provide an effective way of producing high quality digital colored prints from digital images captured on film.

Another object of this invention is to produce high quality digital customized colored prints with a minimum of operator intervention by selecting the appropriate printer mode of operation.

Another object is to provide an arrangement that makes it possibly for a new computer user to simply and easily view their personal digital images on a home computer, select desired images for printing, and produce the best possible prints on their home printer.

These objects are achieved by a method of providing colored adjusted digital files which can be used to make prints by a printing system, including a computer and a local printer, controlled by enabling software stored on the removable storage medium, the original images being provided on colored film, comprising the steps of:

a) scanning the colored film to produce a plurality of digital files representing colored digital images;

b) adjusting the digital files to produce color adjusted digital files, such adjustments including tone scale correction;

c) providing enabling software including at least one software application program for operating the computer that enables the color adjusted digital files to be printed on the local printer, and c) transferring the color adjusted digital files and the enabling software to the removable storage medium.

The present invention can consistently produce high quality colored digitally produced prints from scanned film. At least two major steps are used. The scanned digital image is color adjusted prior to being transferred to a storage medium. It is stored along with enabling printing software. Thereafter, the color adjusted digital image is transformed so that it is customized to work with a particular printer.

An advantage of the present invention is that by color managing the digital image at or after scanning and then storing the image with enabling software on a medium and thereafter transforming the digital image to be consistent with a particular printer, a high quality colored digital print image is produced. It has been determined that it is necessary to first color adjust the digital image and then transform it for printing. By storing both the printing enabling software and the color adjusted digital image on the same medium, such as a magnetic disc, optical disc, or a flash memory card, users can conveniently make colored prints which are aesthetically pleasing. The present invention eliminates the need for operator adjustments and provides a way that a user can rapidly store colored digital images and then convert those stored colored digital images to aesthetically pleasing prints directly. In accordance with the present invention, the printer mode may be automatically selected so that it is able to produce a print which provides the best photographic rendition.

BRIEF DESCRIPTION OF THE DRAWINGS

FIG. 1 illustrates a system which can be used for scanning a color film, storing a color adjusted scanned image on a storage medium and also storing printing enabling software on the same medium;

FIG. 2A illustrates a system which can be used for viewing and printing the images from compact disc using the software contained on compact disc;

FIG. 2B shows a block diagram illustrating a feature of inserting a memory card into a smart printer;

DETAILED DESCRIPTION OF THE INVENTION

Figure 3:
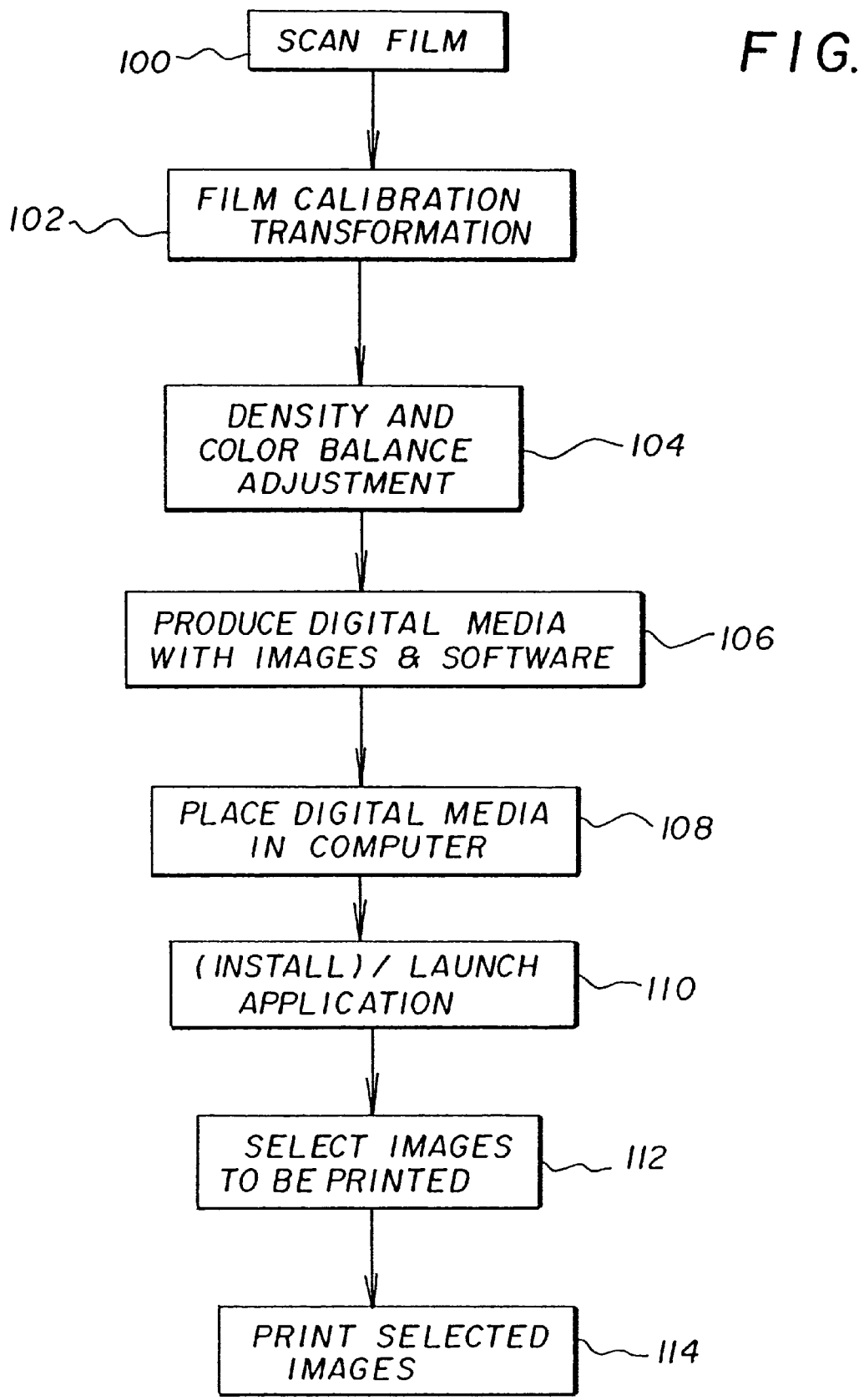
FIG. 3 is a flow chart of a printing selected customized images from scanned film.

FIG. 1 illustrates a system which can be used for scanning a color film, storing a color adjusted scanned image on a storage medium and also storing printing enabling software on the same medium. More specifically, a photographic original such as a film negative or a slide 10 is scanned by a scanning device 12. The scanning device 12 produces a colored digital image having a number of pixels, for example 3072 columns by 2048 rows of red, green, and blue pixel values. Scanners that can be used in accordance with the invention are well known in the art, such as a the Kodak PCD-2000 Scanner. See also commonly assigned U.S. Pat. Nos. 5,218,455; 5,461,492; 5,555,042; and 5,565,912.

The digital image signals from the scanner are forwarded to a computer workstation 14. These digital image signals are color adjusted and temporarily stored or passed directly to a CD recorder 16 by the operation of the workstation 14. The CD recorder 16 causes the color adjusted digital image data 22 to be recorded on a write-once compact disc 18, along with software 20 to enable image printing. Alternately, a hybrid compact disc may be used, as described in U.S. Pat. No. 5,595,389 (incorporated herein by reference) where the software 20 is prepressed at the time the disc is manufactured, and only the digital images 22 are written to the disc as the film is scanned. The compact disc 18 may be supplied to the user with a reference strip 24 which is useful in calibrating the user's home printer to provide improved prints.

FIG. 2A illustrates a system which can be used for viewing and printing the images from compact disc 18 using the software contained on compact disc 18.

The compact disc 18, which can be a write once disc, is inserted into a read only memory (CDR-ROM) drive 44 in a host computer 40. Alternatively, the images 22 and software 20 can be stored on a floppy magnetic disc medium 60 to provide digital image input. This floppy disc 60 is inserted into a floppy disc drive 46. Images 22 and software 20 can also be provided on a removable memory card 32 and, as shown in FIG. 2A, this removable memory card, which can be flash EPROM memory, can be inserted into memory card reader 48 and can also be directly inserted into a smart printer 62 as shown in FIG. 2B. A CPU 50 will be understood to use software in accordance with the present invention that will be described in more detail in FIGS. 3–6. This software can be downloaded from the compact disc 18, CD recorder (writer) 16, or removable memory card 32 and stored on a hard drive 56. The CPU 50 is directly coupled to a display monitor 52 and a keyboard 54. A mouse 55 permits the user to readily communicate with the CPU 50. The CPU 50 is in direct communication with a local printer 58 which produces a hard copy print.

Turning now to FIG. 3 which depicts a block diagram of a process in accordance with the present invention. In step 100, the film is scanned by film scanner 12 in FIG. 1. In step 102, a film calibration transformation is performed. An important feature of the present invention is that the scanned colored digital images stored on the media in step 106 are provided in a proper image data metric as described in commonly assigned U.S. Pat. Nos. 5,609,978 and 5,432,906, the disclosures of which are incorporated herein by reference. In order to provide the proper image data metric, the film scanner 12 must be calibrated for the particular film. This calibration transformation 102 is implemented in workstation 14 to convert a properly exposed digital film image to the proper image data metric. If the film image was under or over exposed, or was not taken under the normal film illumination condition (e.g. daylight balanced film taken under tungsten light), the image is further density and color balance adjusted in step 104 to correct for these conditions, as well as for any other conditions due to non-ideal film manufacturing or keeping problems. Automatic algorithms that provide this correction are well known in the art, and are accomplished in a conventional Kodak PhotoCD system. See, for example, commonly assigned U.S. Pat. Nos. 4,969,204; 5,505,230; and 5,227,789. Furthermore, though not listed in FIG. 3, other image processing functions can also be performed, such as image sharpening and compression.

The color adjusted digital file is then stored to memory in step 106 along with enabling software 20, for example an application program that allows users to view and print the images. This hybrid media is then inserted into a computer 108. The digital memory 18, 60, or 32 is inserted into the proper reader 44, 46, or 48 in computer 40, shown in FIG. 2.

When the media, for example compact disc 18 is inserted into the computer system 40 via CD-ROM drive 44, the enabling software 20 may be automatically installed and launched, as will be described in more detail below with reference to FIG. 4. High quality digital colored prints are produced with minimum of operator intervention. This is accomplished automatically by code provided on each compact disc 18. Software 20 that is particularly adaptable for providing some of these features is KODAK Picture Easy 3.0. Color adjusted digital images currently on the compact disc 18 are accessed by the software 20 for immediate use/printing. In order for this to occur, the computer system 40, into which the compact disc 18 is being loaded, must evaluate the disc to determine if it has been enabled with the software 20. If the computer 40 is already enabled with the KODAK Picture Easy 3.0 software, the software is launched (step 110) with all the color adjusted digital images on the compact disc 18 being accessible by the software for immediate use/printing. If the computer 40 is not enabled with the KODAK Picture Easy 3.0 software, the software installer for KODAK Picture Easy 3.0 is launched in order to enable the computer 40 to access the images on compact disc 18. After the software has been launched, as shown in step 110, images to be printed are selected in step 112 and printed by the printer 58 (FIG. 2) as shown in step 114.

Figure 4:
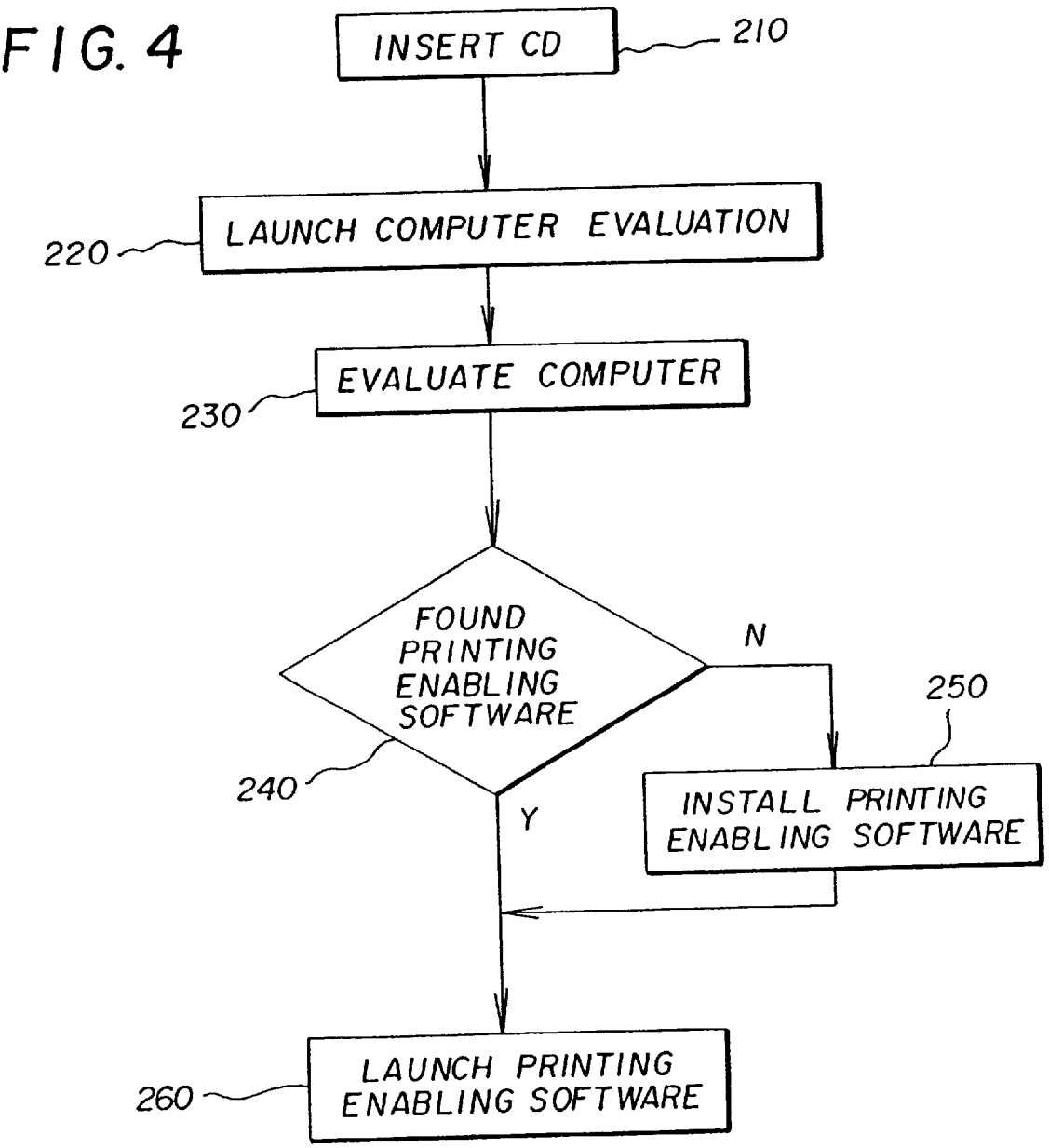
FIG. 4 is a detailed flow chart of the block 110 shown in FIG. 3.

FIG. 4 will now be discussed in detail with reference to using the KODAK Picture Easy 3.0 software. As shown in step 210, a CD 18 containing both the printing enabling software 20 and adjusted digital images 22 is inserted into CD-ROM drive 44 at computer 40 operating in an autorun mode, such as in, for example, Pentium™ PC utilizing the Windows 95™, Windows 98™ operating system. The computer 40 will launch the program to evaluate (step 220) the computer hard drive 56. This evaluation (step 230) consists of searching the computer operating system for the existence of registry keys which indicate the location of the printing enabling software and confirming the location on the hard drive 56. A determination is made (step 240) of the existence of the printing enabling software. If the printing enabling software does not exist in hard drive 56, an installation program (step 250) will be initiated and it will install the printing enabling software. If the printing enabling software exists on the hard drive 56, or has just been installed (step 250), the printing enabling software is directly initiated (step 260). In initiating the printing enabling software, the adjusted digital images 18 will automatically become available for printing.

Figure 5:
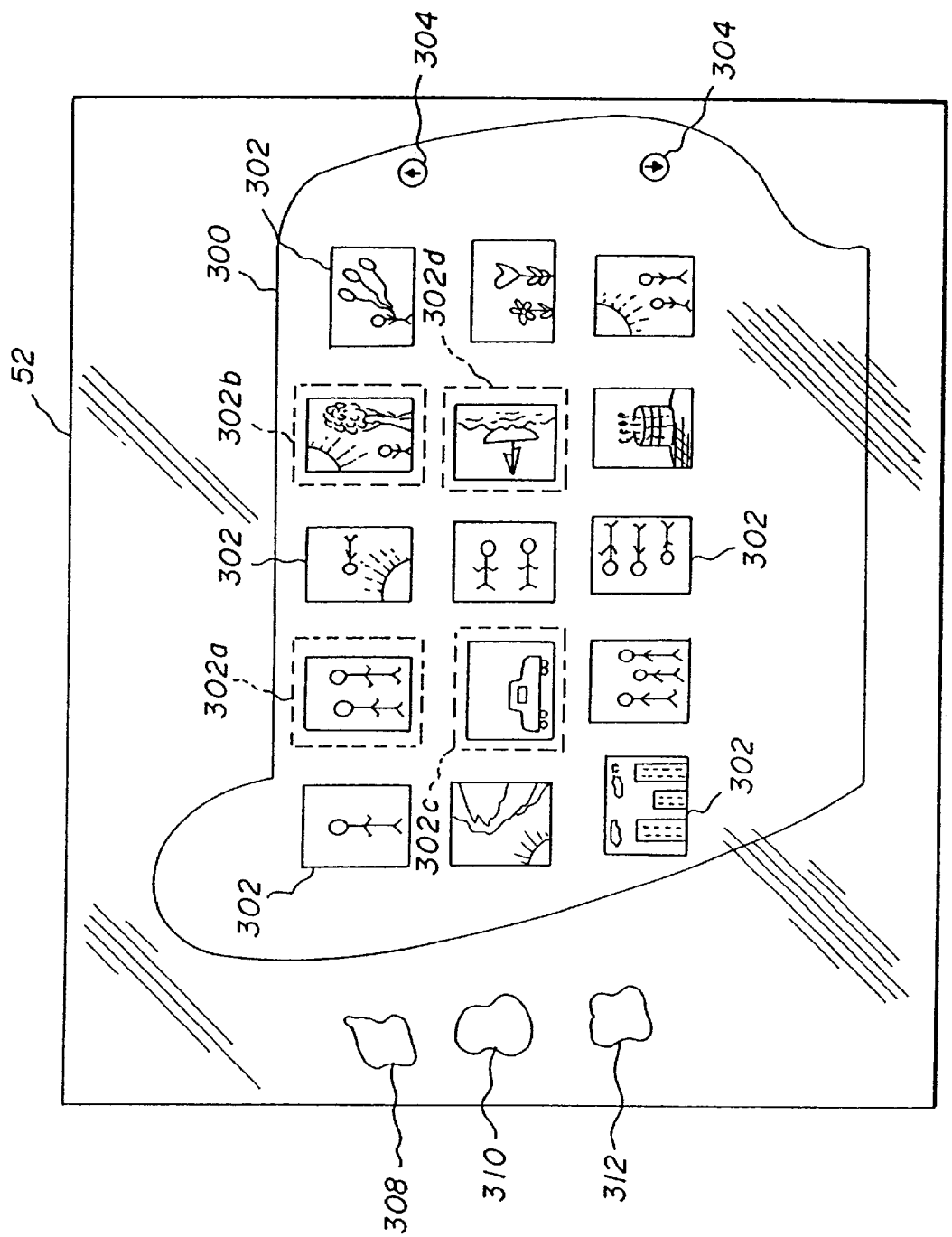
FIG. 5 is a diagram of a computer display screen displaying a group of thumbnail images stored on the storage medium using the software provided on the storage medium.

A "preview picture screen" 300 (shown in FIG. 5) is displayed on the display screen 52 showing a two-dimensional array of thumbnail images 302 obtained from the compact disc 19. The thumbnail images 302 preferably have a lower resolution than the full size images stored on computer disc 18. The user can select multiple images (e.g., four images) by pressing either a control key (not shown) or a shift key (not shown) on the keyboard 54 while clicking the mouse 55 on any number of thumbnail images 302. FIG. 5 shows that four thumbnail images 302*a,* 302*b,* 302*c,* and 302*d* (which are outlined) have been selected. If the disc 18 contains a large number of thumbnail images 302, arrow controls 304 on the right portion of the "preview picture screen" 300 enable the user to scroll through the larger number of thumbnail images 302 to view a group of the thumbnail images 302 (e.g., 15 thumbnail images) at a time.

Once a thumbnail image 302 has been selected, the user can choose to crop the selected images 302 by selecting a "crop" icon 312. The computer then brings up a crop screen (not shown) which allows images to be trimmed.

The user can then select additional images (e.g., three images) to be printed again pressing the control key or the shift key on the keyboard 54 while clicking the mouse 55 on any number of thumbnail images 302.

Figure 6:
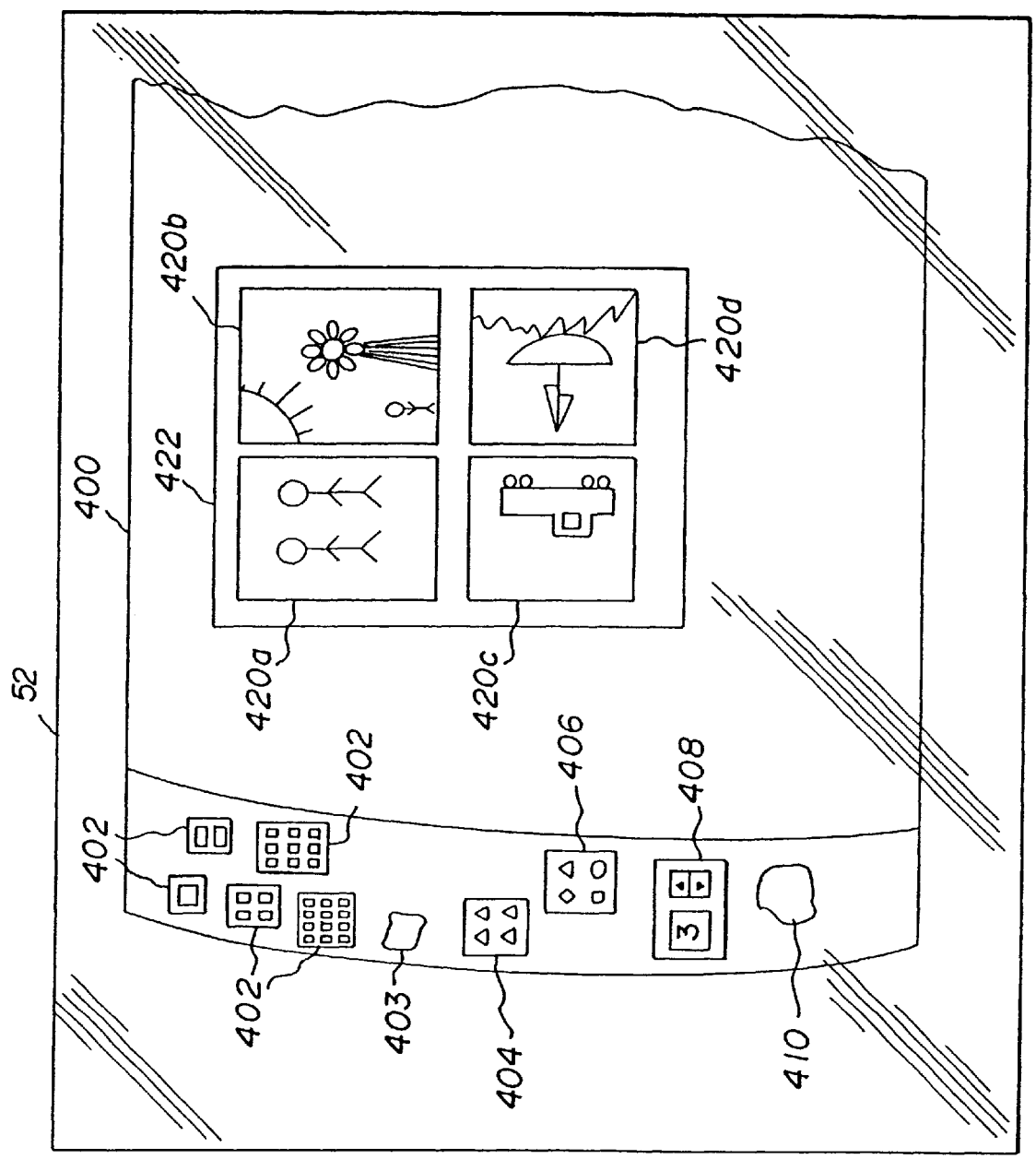
FIG. 6 is a diagram of a computer display showing a print function display screen.

The "preview picture screen" 300 also displays a set of function icons on the periphery of the screen 300, including a "local print" icon 308 and a "slide show" icon 310. The user can print all of these selected images on the local printer 58, for example, a color ink jet printer, by clicking on the "local print" icon 308. This brings up a "print function display screen" 400 shown in FIG. 6. The user then chooses a type of layout. The user can choose one of several predefined "layout" icons 402 on the periphery of the "print function display screen" 400 which determines how many pictures appear on each page by selecting, for example, 1, 2, 4, 9, or 16 images to be printed per page. Alternatively, the user can select a custom layout 403. The custom layout 403 allows the user to specify the number of columns and rows of images, the horizontal and vertical spacing between images, and the top margin and left margin of the printed page. Once a predefined layout is chosen, the images to be printed appear in a print preview area 422 on the "print function display screen" 400. Based on the number of selected pictures to be printed on a page, the program will automatically select the orientation of the images to best fill up the page. FIG. 6 shows, as an example, four images 420*a,* 420*b,* 420*c,* and 420*d,* which correspond to the selected thumbnail images 302*a,* 302*b,* 302*c,* and 302*d,* respectively, shown in FIG. 5.

Next, the user chooses whether to have the same or different images appear on each page. To have the same one image repeated on one page to be printed (e.g., four copies of one image per page), the user selects a "grouping" icon 404. Alternatively, to have all of the selected images appear on the page(s) to be printed (e.g., four different images on one page), the user selects a "collating" icon 406.

The user then chooses the number of sets of images to print, for example, three copies of each laid out page, by typing in the number of desired sets in a text field 408 on the left portion of the "print function display screen" 400 by using the up and down arrow keys on the right portion of icon 410. After making these selections, the user can press a "print now" icon 410 and walk away from the host computer 14. Each of the selected images will be printed automatically on the local printer 58, without further user interaction.

The program prepares the printed layout by calculating the image size which enables the selected number of images to fit on a page, and rotating the selected images as necessary so that landscape oriented images and portrait oriented images fit together on the page to be printed. The image data is automatically interpolated or decimated to provide the proper image data to fill the page with the selected number of images. In this process, the program also calculates for "white space" to be positioned between the images to facilitate the cutting of the page into individual pictures. In other words, the program calculates the number of the selected images in vertical and horizontal directions, and calculates the size of the selected images in the vertical and horizontal directions to cause "white space" to separate the selected images. When the images are printed, the orientation of the images is printed to best "fill up the page" based on the selected number of images.

An example of a PC Card Flash and Compact Flash Card Reader 48 is the "CameraConnect" (™) made by ActionTec Electronics, Inc., 1269 Innsbruck Drive, Sunnyvale, Calif. Examples of removable memory cards 32 are the Flash Memory Versa card Model #P-CF030-PA, the COMPACT-FLASH (TM) made by SanDisc and described in U.S. Pat. Nos. 5,070,032; 5,172,338; 5,268,870; and 5,279,148.

EXAMPLES

Example 1

A series of film negatives and slides were first scanned using the Kodak PhotoCD Scanner. The digital images were color adjusted using PhotoCD software. The color adjusted digital images were then transferred to an optical write-once compact disc as Flashpix image files.

To this write-once compact disc was also transferred the printing enabling software known as the Kodak Picture Easy 3.0 so that this compact disc contained both the color adjusted digital images and the printing enabling software.

This compact disc was then inserted into a Gateway 2000 computer and the Kodak Picture Easy Software was installed from the disc.

Using the Kodak Picture Easy Software, the color adjusted digital images were imported from the compact disc and sent to an Epson Stylus Photo Ink Jet Printer with no image manipulation. In a few minutes the printed images were obtained on Kodak Ink Jet Paper and were of very high quality.

Example 2

A series of film negatives and slides were first scanned using the Kodak PhotoCD Scanner. The digital images were color adjusted using PhotoCD software. The color adjusted digital images were then transferred to a 30 MB Flash Memory Versa Card using a CameraConnect (™) PC Card and Compact Flash Reader and a Gateway 2000 Computer and stored to Flashpix image files.

To this same Flash Memory Versa Card was also transferred the printing enabling software known as Kodak Picture Easy 3.0 so that this Flash Memory Card contained both the color adjusted digital images and printing enabling software.

This Flash Memory Card was then used by the computer to access the Kodak Picture Easy Software.

Using the Kodak Picture Easy Software, the color adjusted digital images were imported from the Flash Memory Card and sent to an Epson Stylus Photo Ink Jet Printer with no image manipulation. In a few minutes the printed images were obtained on Kodak Ink Jet Paper and were of very high quality.

Example 3

The Flash Memory Card of Example 2 which contained both the scanned film images and the printing enabling software was inserted into a Panasonic Photo Printer PV-PD2000. In this case the digital images are read by the Printer and printed directly to its thermal paper. Since the original scanned film images were of high quality the final prints were also of high quality.

The present invention is particularly useful for producing a memory storage product comprising a readable storage medium produced by the steps outlined above. The memory storage product can be a removable memory card 32 using flash EPROM memory which is useable directly by a printer 62 or it can alternately comprise, for example, magnetic storage media such as magnetic disc (such as a floppy disc) or magnetic tape; optical storage media such as optical disc, optical tape, or machine readable bar code; solid state electronic storage devices such as random access memory (RAM), or programmable read only memory (PROM); or any other physical device or medium employed to operate a printer.

The invention has been described in detail with particular reference to certain preferred embodiments thereof, but it will be understood that variations and modifications can be effected within the spirit and scope of the invention.

PARTS LIST 10 slide
12 film scanner
14 computer workstation\host computer
16 CD recorder (writer)
18 write-once compact\computer disc with digital memory with adjusted digital images
19 compact disc
20 enabling software
22 color adjusted digital image data
24 reference strip
32 removable flash memory card or digital memory
40 host computer
44 read only memory (CDR-ROM) drive
46 floppy disc drive
48 memory card reader
50 CPU
52 display monitor\screen
54 keyboard
55 mouse
56 hard drive
58 local printer
60 floppy disc
62 smart printer
100 scan film
102 calibration transformation
104 density & color balance adjustment
106 produces digital media with images & software
108 place digital media in computer
110 (install)/launch application
112 select images to be printed
114 print selected images
210 insert CD
220 launch computer evaluation
230 launch computer
240 found printing enabling software
250 install printing enabling software
260 launch printing enabling software
300 preview picture screen
302 thumbnail images
302a thumbnail images
302b thumbnail images
302c thumbnail images
302d thumbnail images
304 arrow controls
308 local print icon
310 slide show icon
312 crop icon
400 print function display screen
402 layout icons
403 custom layout
404 grouping icon
408 text field
406 collating icon
410 print now icon
420a image
420b image
420c image
420d image
422 print preview area

What is claimed is:

1. A method of providing colored adjusted digital files which can be used to make prints by a printing system, including a computer and a local printer, controlled by enabling software stored on a removable storage medium, the original images being provided on colored film, comprising the steps of:
    a) scanning the colored film to produce a plurality of digital files representing colored digital images;
    b) adjusting the digital files to produce color adjusted digital files, such adjustments including tone scale correction;
    c) providing enabling software including at least one software application program for operating the computer that enables the color adjusted digital files to be printed on the local printer, and
    d) transferring the color adjusted digital files and the enabling software to the removable storage medium.

2. The method of claim 1 wherein the removable storage medium is write-once disc.

3. The method of claim 2 wherein the enabling software is prepressed at the time the write-once disc is manufactured.

4. The method of claim 1 wherein the software application program is automatically launched when the removable medium is coupled to the computer.

5. The method of claim 1 wherein the printing system further includes a display coupled to the computer, and the enabling software further enables the color adjusted digital files to be viewed on the monitor and selected for printing.

6. The method of claim 5 wherein the enabling software further enables multiple digital files to be selected for printing on a same page.

7. The method of claim 6 wherein the enabling software further enables the selected digital image files to be cropped.

8. A memory storage product, comprising a removable storage medium for a printing system, including a computer and a local printer, produced by the steps comprising:
   a) scanning a colored film original to produce a digital signal representing a colored digital image;
   b) color adjusting the digital signal to produce a color adjusted digital file, such adjustments including tone scale correction; and
   c) transferring the color adjusted digital file and a printing enabling software to the removable storage medium which can be used by the printing system to operate on the color adjusted digital file to produce a print.

9. The method of claim 8 wherein the removable storage medium is write-once disc.

10. The method of claim 9 wherein the printing enabling software is prepressed at the time the write-once disc is manufactured.

11. The method of claim 8 wherein the printing enabling software includes a software application program for controlling the computer.

12. The method of claim 8 wherein the printing system further includes a display coupled to the computer, and the printing enabling software further enables the color adjusted digital file to be viewed on the monitor and selected for printing.

13. The method of claim 12 wherein the removable storage medium contains a plurality of color adjusted digital files, and the printing enabling software further enables at least two color adjusted digital files to be printed on a same page.

14. The method of claim 13 wherein the printing enabling software further enables a selected digital image file to be cropped prior to printing.

* * * * *